United States Patent [19]

Johnson et al.

[11] Patent Number: 5,027,249
[45] Date of Patent: Jun. 25, 1991

[54] TAPE CARTRIDGE BEARING

[75] Inventors: Michael W. Johnson, Cottage Grove, Minn.; M. Lee McFarland, Thousand Oaks, Calif.

[73] Assignee: Minnesota Mining & Manufacturing Company, St. Paul, Minn.

[21] Appl. No.: 434,413

[22] Filed: Nov. 9, 1989

[51] Int. Cl.⁵ .............................................. G11B 23/08
[52] U.S. Cl. ...................................... 360/132; 242/199
[58] Field of Search ............. 360/132; 242/55.19 A, 242/199

[56] References Cited

U.S. PATENT DOCUMENTS 3,257,084  1/1966  Cole, Jr. ................... 242/55.19 A
4,396,962  8/1963  Beaujean ..................... 242/199 X
4,535,370  8/1985  Gervais ............................ 360/60
4,674,703  6/1987  Falk ............................ 360/132 X
4,896,238  1/1990  Oogi et al. ...................... 360/132

Primary Examiner—John H. Wolff
Attorney, Agent, or Firm—Kinney & Lange

[57] ABSTRACT

A bearing assembly for a tape support reel in a tape cartridge housing has a single ball bearing and a bearing support mounted to the housing to extend along a rotational axis of the reel. The bearing assembly also has a concave bearing surface on an opposed surface of the reel for receiving the ball bearing and a coil spring for urging the bearing support and ball bearing against the concave bearing surface.

8 Claims, 2 Drawing Sheets 5,027,249

TAPE CARTRIDGE BEARING

BACKGROUND OF THE INVENTION

1. Field of the Invention

The present invention relates generally to computer data storage devices such as tape reel cartridges. In particular, the present invention relates to an apparatus for rotary stabilization and drive engagement of a tape reel housed within a tape reel cartridge.

2. Description of the Prior Art

Computer systems presently use a variety of devices to store processed data. One such storage device is a cartridge with encodable magnetic tape therein. The tape passes over a sensory head which encodes data onto the tape in a magnetically recognizable pattern. The sensory head may also be used for data retrieval which includes decoding the magnetic pattern and reading the data from the tape. This encodable magnetic tape is used in VHS videocassettes and high fidelity audio cassettes with respective tape drive systems. Typically, the cassette is engaged by a tape drive system to allow indexing of the tape across the sensory head to encode and retrieve data magnetically stored on the tape.

One type of tape cassette consists of two reels laterally spaced from one another with magnetic tape connected to and circumferentially wound about each reel. A drive mechanism engages one or both of the reels to rotate the reels thereby transferring the tape from reel to reel. As the tape is wound from one reel to the other, it passes over the sensory head for encoding or retrieval of data.

A second type of tape cassette consists of a single cassette reel design. A loose end of the tape engages a reel or tape winding structure that is part of the tape drive mechanism. The tape winding structure pulls the tape from the single cassette reel, over a sensory head for encoding and retrieval of data. The tape may be wound on an external reel, or may be fed back onto the cassette's reel as an "endless loop" of tape.

In either cassette type, the reels are typically enclosed in a tape reel housing and each reel has a circular platter connected to a hub about which the tape is wound. The hub is typically engageable by a drive mechanism to cause rotation of the hub and platter. By controlling rotation of the hub and platter, the tape is either wound onto or unwound from the hub.

One such cassette of the single reel type is used for computers with ¼ inch magnetic tape. The hub on the reel in this cassette is mounted on the housing on a rotational axis perpendicular to the platter by a center pivot between the hub and the housing. The center pivot includes a self-enclosed radial commercial ball bearing with its outer race affixed to the hub and its inner race affixed to a stem mounted to the tape reel housing. The circular platter is engageable with reel locks mounted on the tape reel housing which can be moved into engagement with the edge of the circular platter to constrain rotation of the reel.

A coil spring is used to urge the hub against an external tape cassette drive mechanism, thereby maintaining the hub in alignment for proper rotation within the housing, and in appropriate alignment for engagement with the drive mechanism. However, the use of a coil spring as the sole mechanical connector between the hub and housing provides a less stable arrangement than is desired, since the spring may have a tendency to bend during rotation. Since the current bearing is essentially a radial load design and is being used to transmit a thrust load, the bending and vibration of the spring is transmitted through the bearing's outer race to the reel.

This direct influence of the dynamic forces from the spring on the reel can cause a variety of problems. One such problem is undesirable vibrations which can occur during rotation of the hub. The vibrations result because the coil spring reacts to varying loads which are placed on it as the hub and platter rotate. The reel tilts randomly in response to the vibrations that can lead to nonuniform tape winding about the hub. Poor tape winding may result in damage to the tape and possible data loss.

Another concern with the present tape reel cartridges involves the relative cost of the commercial self-enclosed ball bearing used in the center pivot of the hub. The self-enclosed bearing is disproportionately expensive relative to the other parts of the cartridge.

For these reasons, there is a need for an inexpensive tape reel cartridge bearing for the ¼ inch computer tape cartridge that provides stable rotation and drive engagement of the tape reel and which is easy to assemble. Desireable characteristics for such a bearing include a stable center pivot and rotational axis for the tape reel so that spring bending and spring vibrations during tape reel rotation are minimized.

SUMMARY OF THE INVENTION

The present invention is a bearing for a tape reel rotatably mounted in a tape reel housing. The housing has a first inner wall face and the reel has a second inner wall face aligned generally parallel to the first inner wall face. An axis extending perpendicularly through the second inner wall face defines a rotational axis for the reel. The bearing includes a concave bearing surface carried on one of the inner wall faces and which is aligned concentrically with the rotational axis of the reel. A single ball bearing is rotatably and concentrically received in the concave bearing surface. A bearing support is carried by the other of the inner wall faces and has a recess at a first end for receiving the ball bearing. The bearing support extends coaxially along the rotational axis to a second end of the bearing support, which is retained by a portion of the other one of the inner wall faces in axial alignment with the rotational axis. The bearing device also includes spring means for urging the bearing support and ball bearing carried thereon against the concave bearing surface.

DETAILED DESCRIPTION OF THE PREFERRED EMBODIMENTS

Figure 1:
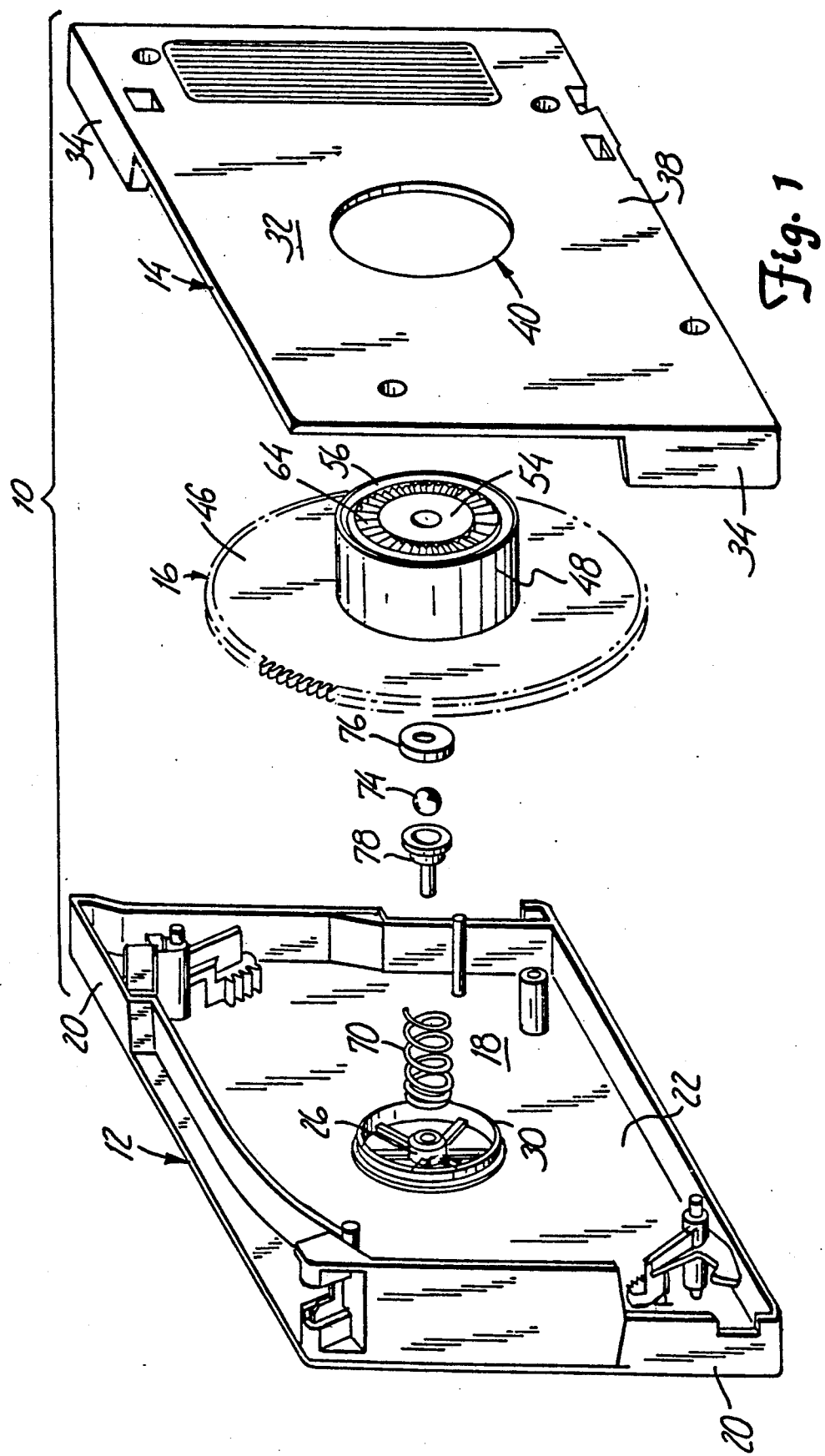
FIG. 1 is an exploded perspective view of a tape cartridge assembly incorporating an improved bearing device of the present invention.
Figure 2:
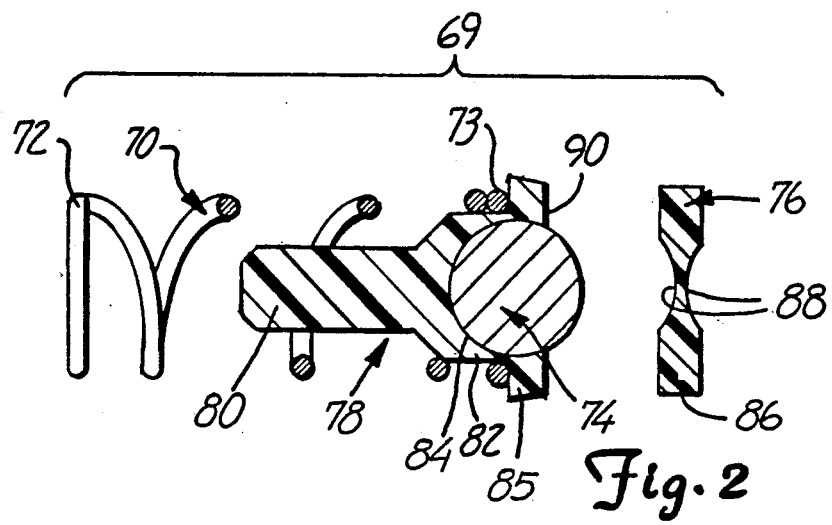
FIG. 2 is an enlarged sectional view of some of the components of the improved bearing device.
Figure 3:
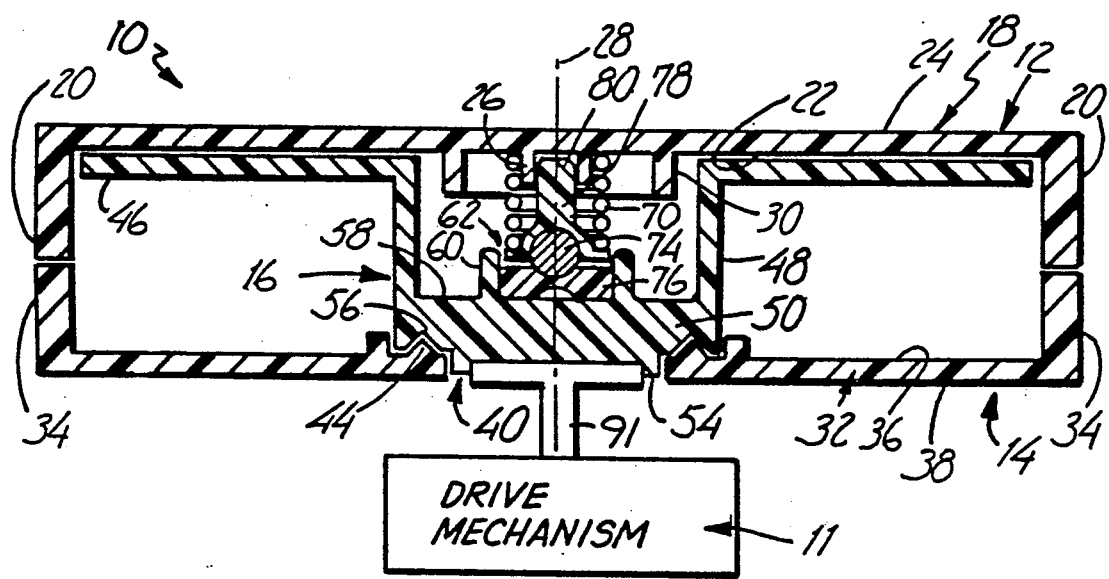
FIG. 3 is a sectional view of the improved bearing device as operatively disposed in an assembled tape cartridge assembly.

A tape reel cartridge assembly 10, which is engageable with a tape drive mechanism 11, is illustrated in FIGS. 1-3. The tape reel cartridge assembly 10 includes first and second housing members 12 and 14, respectively, which when assembled encase a tape support reel 16. The first housing member 12 is generally rectangular and has a substantially planar end wall 18 and side walls 20 connected thereto. The end wall has an inner hub wall side 22 and an outer side 24. FIG. 3 shows that a circular ring wall 26 is formed on the inner hub wall side 22 of the end wall 18 concentrically about a reel drive axis 28 which is aligned perpendicularly to the inner hub wall side 22. The inner hub wall 22 also includes a circular outer stub wall 30, formed concentrically around the ring wall 26.

The second housing member 14 is also generally rectangular and includes a substantially planar end wall 32 with side walls 34 connected thereto. The end wall 32 has an inner wall side 36 and an outer wall side 38, and further has a circular opening 40, coaxial with the drive axis 28, for permitting engagement of the support reel 16 with a rotational drive mechanism 11. An annular ridge 44 is formed about the opening 40 on the inner wall side 36 of the end wall 32 in the second housing member 14.

Upon assembly of the first and second housing members 12 and 14, their side walls 20 and 34 abut and are engaged to define a container for the reel 16 and tape supported thereby.

The tape support reel 16 has a flat round platter portion 46 and a central cylindrical hub 48 which extends axially from one side of the platter portion 46. The hub 48 has a closed end 50 spaced from the platter portion 46 and an open end 52 which bisects the platter portion 46. As seen in FIG. 1, the tape support reel 16 also has a plurality of radially extending grooves 64 on the outer side 54 of the closed end 50 on its central cylindrical hub 48. The grooves 64 are adapted to mate with corresponding ridges (not shown) on the drive mechanism 11, to define an affirmative engagement between the drive mechanism 11 and the rotatable tape support reel 16.

An outer side 54 of the closed end 50 includes an annular groove 56 which is in mated alignment with the annular ridge 44 on the second housing member 14 when the components of the cartridge assembly 10 are assembled as seen in FIG. 3. On an inner side 58 of the closed end 50, an upstanding annular rim wall 60 defines a counterbore 62 concentrically aligned with the reel drive axis 28 upon assembly of the components of the tape cartridge assembly 10 as seen in FIG. 3.

The tape cartridge assembly 10 includes a bearing 69 operable between the first housing member 12 and the tape support reel 16. The bearing includes a coil spring 70 having a first end 72 and a second end 73. The bearing also includes a single ball bearing 74, a bearing disc 76, and an elongated bearing support or plug 78.

The elongated bearing support 78 extends through the coil spring 70 and has a stem end 80 and a bowl end 82. Bowl end 82 has an arcuate bowl 84. When assembled, the stem end 80 of the bearing support 78 is adjacent the first end 72 of spring 70 and the bowl end 82 of bearing support 78 is adjacent the second end 73 of spring 70, as seen in FIG. 2. The bowl 84 is an arcuate surface formed within the bowl end 82 and is adapted to receive the ball bearing 74 securely, as also seen in FIG. 2. The bowl end 82 also has a shoulder 85 around the bowl 84 against which the second end 73 of the spring 70 abuts when the spring 70 is mounted about the bearing support 78 as seen in FIG. 2.

The bearing disc 76 has an outer edge 86 and a pair of opposed, circular concave recesses or concave bearing surfaces 88 formed at the center of the disc 76. The recesses 88 of the disc 76 are adapted to receive a portion of the ball bearing 74 upon assembly of the bearing. The outer edge 86 of disc 76 is a smooth surface which extends about the circumference of disc 76.

When assembled (as seen in FIG. 3) the bearing is positioned between the tape support reel 16 and the first housing member 12. The bearing extends along the interior of the hub 48 of the tape support reel 16 from the inner side 58 thereof to the inner side wall 22 of the end wall 18 on the first housing member 12. The stem end 80 of the elongated bearing support 78 is mounted and retained within a counterbore defined by the inner ring wall 26 of end wall 18. The first end 72 of the coil spring 70 fits around and over the ring wall 26. The bearing support 78, which acts as a bearing support for the ball bearing 74 thus extends coaxially along the reel rotational axis 28 such that the stem end 80 of the bearing support 78 is in axial alignment with the rotational axis 28.

The bearing disc 76 is friction-fit mounted within the counterbore 62 on the inner side 58 of the hub 48, by the outer edge 86 of the disc 76 frictionally engaging the inner wall of the counterbore 62. The center of exposed recess 88 of disc 76, which acts as a concave bearing surface for the ball bearing 74, is positioned concentrically within the counterbore 62 and is thus also aligned concentrically with the rotational axis 28.

The ball bearing 74 retained within the bowl 84 of bowl end 82 of the bearing support 78 is concentrically received within the recess 88 of the disc 76 upon assembly. The ball bearing 74 is rotatable within the recess 88 of the bearing disc 76. The ball bearing 74 and bearing support 78 are urged toward the exposed recess 88 of bearing disc 76 by the coil spring 70, which tends to extend from its compressed state providing spring tension to maintain contact between the ball bearing 74 and the recess 88. As seen in FIG. 3, opposed surfaces 89 and 90 of the bearing disc 76 and the bearing support 78, respectively, are spaced apart upon assembly of the bearing so the operable bearing surfaces are only on the ball bearing 74 and the recess 88 of the bearing disc 76.

The tape cartridge assembly 10 is shown in an assembled state in FIG. 3. The side walls 20 of the first housing member 12 are shown engaging the side walls 34 of the second housing member 14 to define a tape storage chamber therebetween. Enclosed within the joined housing members 12 and 14 is the rotatable tape support reel 16.

The open end 52 of the cylindrical hub 48 of tape support reel 16 fits over the outer stub wall 30 of the first housing member 12, so that the stub wall 30 extends into the open end 52 of hub 48. The platter portion 46 of the reel 16 is generally parallel to and spaced apart from the inner hub wall side 22 of the end wall 18 on the first housing member 12 (by action of the coil spring 70).

The bearing of the assembled tape cartridge assembly 10 is positioned between the tape support reel 16 and the first housing member 12, and bearing extends along the reel rotational axis 28. The bearing acts as a center pivot to provide a rotational axis for the reel 16 which is perpendicular to the inner hub side wall 18 of the first housing member 12 and the inner wall side 36 of the second housing member 14.

Upon assembly, the coil spring 70 is in a compressed state, and urges the support reel 16 away from the first housing member 12. Prior to operable connection with the drive mechanism 11, the annular groove 56 is thus urged into mating engagement with the annular ridge 44 composition including antimicrobial preservatives, antioxidants, chelating agents, and buffers can be added. Any vehicle, diluent, or additive used would, however, have to be biocompatible and compatible with ST and PRL according to the present invention.

ST and PRL according to the present invention can be administered to the animal in the form of a slow-release subcutaneous implant which is inserted beneath the skin of the animal. The implant can take the form of a pellet which slowly dissolves after being implanted in the animal or a biocompatible and animal compatible delivery module well known to those skilled in the art. Such well known dosage forms are designed such that the active ingredients are slowly released over a period of several days to several weeks. The implant is designed to deliver from about 0.1–24 mg/animal/day.

Although not preferred because the digestive system tends to inactivate proteins, ST and PRL can be administered orally if administered in a dosage form which prevents inactivation of the compounds by the digestive system. Such techniques and dosage forms are well known in the art; U.S. Pat. No. 4,639,435 to Fujii et al. discloses pharmaceutical compositions designed to deliver protein compounds orally without significant loss of bioactivity usually associated with oral administration.

ST and PRL according to the present invention are used to stimulate the production of macrophages and augment the oxidative metabolism of macrophages which combat infectious disease-causing agents such as viruses, bacteria, fungi, protozoa, helminths, and the like. The present invention is, therefore, useful for preventing and treating diseases caused by those agents in animals.

Any animal species susceptible to disease caused by these pathogenic disease causing agents can be administered ST and PRL according to the present invention. Human, bovine, porcine, canine, feline, equine, avian, and ovine are preferred, with livestock and poultry such as cattle, swine, sheep, chickens, and turkeys being most preferred.

Preventing or treating diseases such as Atrophic Rhinitis and Pleuropneumonia in swine, and Infectious Respiratory Tract Disease (IRD) and Mastitis in cattle are particular examples of possible uses for the present invention. Other possible uses for the present invention include resisting and inhibiting the growth of tumorous cells.

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

Peripheral blood was collected from ten-week-old pigs and monocyte-derived mononuclear phagocytes were separated on a plasma Percoll gradient, as previously described in Musson, Am. J. Path. 111:331 (1983). These cells were washed twice in Hanks balanced salt solution (HBSS), adjusted to $2 \times 10^6$ cells/ml in Dulbecco's modified Eagle's medium (DMEM) supplemented with L-glutamine (2 mM), penicillin (50 U/ml), streptomycin (50 ug/ml) and two percent heat-inactivated fetal bovine serum and one ml was plated into 35-mm tissue culture wells. Following a two-hour incubation at 37° C. in a 5% $CO_2$ atmosphere, nonadherent cells were removed by washing with DMEM. Adherent cells (>90% α-naphthyl esterase positive) were incubated in fresh DMEM containing lipopolysaccharide (LPS) as a positive control (10 EU/ml) or various concentrations of pituitary-derived porcine somatotropin (pST), recombinant porcine somatotropin (rpST) or porcine pituitary-derived prolactin (npPRL). All tissue culture reagents and peptides were free of endotoxin (sensitivity of <0.01 EU/ml) as assessed by the chromagenic limulus ameobocyte lysate assay. Following a 24-hr incubation, $O_2-$ release was stimulated by the addition of 100 μl opsonized zymosan (Op-Zym, 1mg/ml) and determined spectrophotometrically by measuring superoxide dismutase-inhibitable reduction of ferricytochrome c and expressed as nMole $O_2-$/mg mononuclear phagocyte protein/hour. The results are shown in Table 1.

Referring to Table 1, in the absence of op-zym, mononuclear phagocytes released no $O_2-$. Normal mononuclear cells released only small amounts of $O_2-$ (36 nMole $O_2-$/mg protein/hour) when stimulated with opsonized zymosan. In contrast, the positive control LPS, which is a potent inducer of $O_2-$ (Edwards, J. Immunol., 136:1820 1986), caused the release of 228 nMole $O_2-$/mg protein/hr. When mononuclear phagocytes were incubated with either pituitary-derived somatotropin or pituitary-derived prolactin and then stimulated with op-zym, there was a significant correlation between pST level and $O_2-$ release (r=0.89 and 0.88, respectively). These positive effects were not caused by contaminating peptides in the pituitary-derived preparations. Recombinant porcine somatotropin yielded a similar dose response curve to that of npST. Also the effect of 500 ng/ml pST or PRL was blocked by heat inactivated (56° C.) antibodies against pST or PRL, respectively. The results show that pituitary-derived porcine somatotropin (pST), recombinant porcine somatotropin (rpST), and pituitary-derived prolactin (pPRL) stimulate the production of reactive oxygen intermediates by macrophages. This increased macrophage activity increases the ability of the animal to combat viruses, bacteria, fungi, protozoa, helminths, and other disease causing agents. The proteins can, therefore, be used to prevent and treat infectious diseases.

Example 2

Alveolar macrophages (>98 % α-naphthyl esterase positive) were obtained by pulmonary lavage and isolated by using known methodologies (McGuire et al., J. Reticulo. Soc., 31:251 1982). Eight 10-day-old female pigs were anesthetized with Vetalor-Rompun (Parke-Davis, Nutley, NJ) at a dose of 0.4–0.8 mg/kg body weight before exsanguination and removal of the trachea and lungs. Sixty milliliters of sterile HBSS were instilled into the lungs with a rubber cannula connected to a syringe. The lungs were massaged gently, and the lavage fluids were collected and placed on ice. This lavage procedure was repeated four times. Cells were pelleted by centrifugation at 4° C. for 15 min at 400×g, washed two times, allowed to adhere to plastic culture dishes, treated with pST or rpST for 24 hrs and then assayed for $O_2-$ release after stimulation with op-zym. The positive control was the supernatants from peripheral blood mononuclear cells that had been pretreated with ConA. These supernatants have been shown to have high levels of macrophage activating factors on an outer side thereof which releasably mates with the circular groove of the second housing member.

2. In a tape cartridge which has a first housing member cooperable with a second housing member to define a tape storage chamber therebetween and enclosing a tape support platter, the first housing member having a hub wall with an outer circular stub wall thereon and an inner concentric circular ring wall, the second housing member having an opposed wall generally parallel to and spaced from the hub wall of the first housing member, the opposed wall having a circular groove formed therein about an inner side of an aperture formed therein, the tape support platter having a cylindrical hub with a closed end, the closed end having a circular bore with an inner side and a circular ridge on an outer side thereof which releasably mates with the circular groove of the second housing member, the improvement which comprises:
 an elongated plug having a stem end and a bowl end with an arcuate bowl, the stem end aligned for axial reception within the ring wall of the first housing member;
 a spherical ball bearing securely retained within the arcuate bowl of the plug;
 a bearing disc having a concave recess formed substantially at a center of the disc for receiving the ball bearing; and
 a coil spring having a first end and a second end, a portion of the plug extending through the spring with the first end of the spring mounting on the bowl end of the plug and the second end of the spring mounting about the ring wall of the first housing member.

3. A bearing for supporting a tape support reel mounted within a tape reel cartridge assembly for rotation about a drive axis that extends generally perpendicular to an end wall of the cartridge assembly comprising:
 a concave bearing surface carried on one of the end wall or tape support reel and aligned concentrically with the drive axis of the tape support reel;
 a single ball bearing;
 a bearing support having a bowl at a first end thereof for supporting the ball bearing, the bearing support extending coaxially along the drive axis to a second end thereof which is supported by the other end of the end wall and tape support reel;
 a spring element positioned between the bearing support and the other one of the end wall and tape support reel for urging the bearing support and the ball bearing supported thereon against the concave bearing surface, thereby supporting the tape support reel for rotational movement about the drive axis.

4. The bearing of claim 3 wherein the concave bearing surface is formed in a bearing disc which is carried by the one of the end wall and tape support reel.

5. The bearing of claim 4 wherein the concave bearing surface is a circular concave recess formed substantially at a center of the bearing disc.

6. The bearing of claim 3 wherein the spring element is a coil spring capable of both extension and compression.

7. The bearing of claim 3 wherein the bowl in the bearing support is an arcuate shaped bowl.

8. The bearing of claim 3 wherein the bowl in the bearing support securely retains the single ball bearing therein.

* * * * *

UNITED STATES PATENT AND TRADEMARK OFFICE
CERTIFICATE OF CORRECTION

PATENT NO. : 5,027,249

DATED : June 25, 1991

INVENTOR(S) : Michael W. Johnson et al

It is certified that error appears in the above-identified patent and that said Letters Patent is hereby corrected as shown below:

Column 5 and 6 should be deleted to appear as per attached column 5 and 6,

Signed and Sealed this

Twenty-ninth Day of September, 1992

Attest:

DOUGLAS B. COMER

Attesting Officer     Acting Commissioner of Patents and Trademarks to hold the support reel 16 generally in place for coupling with the drive mechanism 11, and also to create a dust tight seal for the interior of the tape cartridge assembly 10. The compressed coil spring 70 provides an axial thrust load on the ball bearing 74, through the bearing support 78. The ball bearing 74 is thus urged axially against and into engagement with the recess 88 of the bearing disc 76 carried on the support reel 16.

Operation of the tape reel cartridge assembly 10 begins by inserting the tape cartridge assembly 10 into a tape cartridge drive unit (not shown) where the drive mechanism 11 interacts with the cartridge assembly 10. A rotatable drive member 91 extends from the drive mechanism 11 to engage the hub 48 of the tape support reel 16. The drive member 91 releasably meshes with the plurality of radially extending grooves 64 on the hub 48, and, as shown, places the coil spring 70 further into compression, whereby the annular ridge 44 is no longer in engagement with the annular groove 56. Spring tension from the compressed coil spring 70 urges the hub 48 against the drive member 91 of drive mechanism 11 to maintain engagement of the grooves 64 and drive member 91. Even as further compressed, the coil spring 70 maintains the platter portion 46 of tape support reel 16 spaced from the end wall 18 of the first housing member 12 so that the reel 16 is free from contact with the first housing member 12 during rotation. Thus the only support for the support reel 16 during operation is axial, through the drive member 91 of the drive mechanism 11 and through the bearing.

Once the hub 48 of tape cartridge 10 is engaged, the drive mechanism 11 is activated to cause rotation of its drive member 91. This causes the reel 16 to rotate about the rotational axis 28 relative to the first housing member 12 and second housing member 14. This rotation of the reel 16 about the defined rotational axis 28 results in tape being wound about or unwound from the hub 48 depending on the direction of rotation.

In one preferred embodiment, the ball bearing 74 is a Grade 100 chrome steel ball having a diameter of approximately one-quarter inch. The bearing disc 76 and elongated bearing support 78 are nylon material, such as Delrin 500 ®, impregnated with approximately fifteen percent polytetrafluoroethylene powder such as Teflon ® powder. The first housing member 12 and second housing member 14 are formed by injection molding a glass filled polycarbonate.

Also, in one preferred embodiment, the bearing disc 76 has a thickness of 0.15 inches and a diameter of one-half inch. The recess 88 of disc 76 has a radius of 0.125 inches. The elongated bearing support 78 has a length of 0.525 inches and the stem end 80 of bearing support 78 has a diameter of approximately 0.05 inches. Each of the housing members 12 and 14 have dimensions of approximately four inches by four inches by one-half inch. The spring 70 is a steel coil spring having a length of approximately one inch and a diameter of three-eighths inches.

The bearing arrangement of the present invention has several advantageous features over prior bearing configurations. In addition to the constraints imposed on the rotating hub 48 and reel 16 by the first and second housing members 12 and 14, the bearing provides a constraint to maintain the rotation of hub 48 and reel 16 in a nearly singular rotational axis so that tilting of the reel 16 is minimized. The retention of the stem end 80 of the bearing support 78 within the ring wall 26 of the first housing member 12 maintains the support 78 and spring 70 in a substantially upright relation along the rotational axis 28. Therefore the bearing support 78 is preventing from tilting off the rotational axis 28 by the support 78 being inserted within the ring wall 26. This arrangement insures that the surface 90 on the bearing support 78 does not contact the opposed surface 89 of the bearing disc 76, therefore eliminating any transfer of coil spring 70 vibration or bending to the support reel 16.

This unique arrangement for aligning and controlling the thrust load forces on the support reel 16 diminishes the undesirable effects that occurred during rotation using prior bearing arrangements. Since lateral bending (off axis 28) of the spring 70 during rotation is substantially prevented from being transmitted to the reel 16 the subsequent vibrations of the spring 70 are also diminished. Therefore, the bearing of the present invention allows more uniform winding of the tape about hub 16.

Another advantageous feature of the bearing of the present invention is the simple means for facilitating reel rotation provided by the single ball bearing 74 and the bearing disc 76. In contrast to the multiple ball bearing used in the prior bearing devices, which was radial load bearing being used in a thrust load application, the ball bearing of the present invention is a singular element with no moving parts and transmits the thrust load directly through the center. The support reel 16 merely rotates relative to the ball 74 and the bearing disc 76. Further, the ball bearing 74 and the bearing disc 76 are simple and inexpensive to manufacture relative to the multiple ball bearing design.

Although the present invention has been described with reference to preferred embodiments, workers skilled in the art will recognize that changes may be made in form and detail without departing from the spirit and scope of the invention.

What is claimed is:

1. A tape cartridge which comprises:
   an elongated plug having a stem end and a bowl end with an arcuate bowl;
   a spherical ball bearing securely retained within the arcuate bowl of the plug;
   a bearing disc having a concave recess formed at a center of the disc for receiving the ball bearing;
   a first housing member having a hub wall with an outer circular stub wall thereon and an inner concentric circular ring wall, with the ring wall aligned for axial reception of the stem end of the plug;
   a coil spring having a first end and a second end, a portion of the plug extending through the spring with the first end of the spring mounting on the bowl end of the plug and the second end of the spring mounting about the ring wall of the first housing member;
   a second housing member cooperable with the first housing member to define a tape storage chamber therebetween, the second housing member having an opposed wall generally parallel to and spaced from the hub wall of the first housing member, the opposed wall having a circular hub aperture therethrough and the opposed wall having a circular groove formed therein about an inner side of the aperture; and
   a tape support platter having a cylindrical hub with a closed end, the closed end having a circular bore for reception of the bearing disc on an inner side thereof and, the closed end having a circular ridge